United States Patent [19]

Laquerre

[11] Patent Number: 4,777,788
[45] Date of Patent: Oct. 18, 1988

[54] WINDROW TURNING APPARATUS

[75] Inventor: Yves Laquerre, Dorval, Canada

[73] Assignee: B. & R. Choiniere Limited, Quebec, Canada

[21] Appl. No.: 30,140

[22] Filed: Mar. 26, 1987

[51] Int. Cl.$^4$ .............................................. A01D 84/00
[52] U.S. Cl. .......................................... 56/376; 56/366
[58] Field of Search ................. 56/160, 161, 192, 365, 56/366, 367, 368, 376, 377, DIG. 21

[56] References Cited

U.S. PATENT DOCUMENTS 4,182,103  1/1980  McNutt ................................. 56/377

FOREIGN PATENT DOCUMENTS 2655627  6/1977  Fed. Rep. of Germany ........ 56/366

Primary Examiner—John Weiss
Attorney, Agent, or Firm—Cushman, Darby & Cushman

[57] ABSTRACT

The present invention relates to an apparatus for inverting a windrow of hay or the like. The apparatus is in the form of an implement to be drawn by a tractor or any other appropriate vehicle and comprises a wheeled carriage on which is mounted a pick-up conveyor assembly for gathering an elevating material from a windrow and depositing the elevated material on a rotating platform which moves the material 180 degrees along a circular path. The material is then discharged on the ground in inverted condition by the forward motion of the carriage.

13 Claims, 3 Drawing Sheets

WINDROW TURNING APPARATUS

FIELD OF THE INVENTION

The present invention relates to agricultural equipment and more particularly to an apparatus for inverting a windrow of hay in a delicate manner to reduce the possibilities of a loss of the nutrient qualities of the hay.

BACKGROUND OF THE INVENTION

Hay, which is extensively used by farmers for fodder is prepared by mowing and raking grass or leafy plants in windrows which remain in the field for a few days to dry before being picked up and compacted for storage. To accelerate the curing of the hay, it is a common procedure to turn the windrow with a side rake once the upper side is dry, to expose to the sun the underside which is still damp.

In the past, various machines have been designed to automatically carry out this operation. As an example, the United States patent of J. B. Kucera, U.S. Pat. No. 2,391,427, discloses a windrow inverting apparatus in the form of a carriage to be drawn by a tractor and comprising a lower horizontal platform with inlet and outlet openings, and an upper horizontal rotatable device with downwardly extending prongs. In operation, material from the windrow enters on the lower platform through the inlet opening and it is advanced to the outlet opening by the prongs of the upper rotating device. From the outlet opening the material falls on the ground in inverted condition.

While this type of devices are satisfactory for certain types of grasses, when used to turn a windrow of leafy plants such as alfalfa, clover, trefoil or the like a loss of the nutrient qualities of the hay has been noted.

Most of the nutrition of the hay made of leafy plants is contained in the small leaves thereof which dry faster than the stems do and become brittle. The windrow turning apparatuses of the type described above manipulate the hay vigorously by advancing the hay by means of prongs engaging the upper side thereof which is dry. As a result, many leaves are detached from the stems, severely degrading the nutrient qualities of the hay.

OBJECTS AND STATEMENT OF THE INVENTION

An object of the present invention is an apparatus to invert a windrow of hay without undue agitation to reduce the possibility of a loss of the nutrient qualities of the hay.

Another object of the invention is a windrow inverting apparatus which is of a relatively simple and unexpensive construction.

The objects of this invention are achieved by providing a windrow turning apparatus comprising a carriage which preferably is to be drawn by a tractor or any other suitable vehicle and comprising, broadly a pick-up conveyor assembly to gather hay from a windrow, and a rotatable platform receiving the hay from the pick-up conveyor assembly. The rotatable platform moves the hay preferably 180 degrees along a circular path and then discharges the hay on the ground in an inverted condition by the forward movement of the machine. Since the hay is supported on the pick-up conveyor and on the rotatable platform on the underside, there is little or no agitation of the upperside which is dry, thus preventing nutricious leaves to break off and become lost.

In a preferred embodiment, the pick-up conveyor assembly comprises an inclined conveyor extending upwardly and rearwardly and which is constituted by an endless belt of rubber like material defining a continuous supporting surface. On the endless belt are mounted a plurality of upstanding pick-up fingers of a type well known in the art. The pick-up conveyor assembly further includes a secondary conveyor lying generally in a horizontal plane and being positioned rearwardly with respect to the inclined conveyor.

When the carriage is advanced in a field over a windrow of hay, hay is gathered by the inclined conveyor and it is elevated and deposited on the secondary horizontal conveyor which delivers the material on the rotatable platform. Guide members or deflectors are positioned adjacent the periphery of the platform and centrally thereof to guide the windrowed material in an arcuate path toward a discharge mouth portion where it is delivered on the ground in inverted position by the forward motion of the machine so as to form a windrow parallel to the unturned windrow but laterally offset therefrom, on dry ground.

Preferably strips of material providing a high degree of friction are mounted on the upperside of the rotatable platform to reduce slipage of the hay thereon.

The rotatable platform and the pick-up conveyor assembly are driven by means of power transmitting elements such as chains, belts, gears or the like which are connected to the wheels of the carriage. This arrangement has two distinct advantages. Firstly, it allows to drive the pick-up conveyor assembly and the rotatable platform at a speed proportional to the speed of the carriage with respect to the ground. Secondly, the construction of the windrow turning apparatus is greatly simplified over other possible arrangements employing a mechanical drive line and a gear box or hydraulic motors to drive the various elements of the apparatus.

Therefore, the present invention comprises in a general aspect an apparatus for inverting a windrow of material such as hay or the like in a delicate manner, the apparatus comprising:

a carriage adapted to be advanced parallel to a windrow of the material lying upon the surface of the ground;

a pick-up conveyor means mounted on the carriage, the pick-up conveyor means extending from a point adjacent to the ground to an elevated position for elevating progressively the windrow from the ground;

a windrow turner including a rotatable platform which is mounted to the carriage adjacent the pick-up conveyor means for receiving windrowed material from the pick-up conveyor means and advancing the material along an approximately circular path;

discharge mouth portion mounted on the carriage adjacent the rotatable platform through which the windrow is deposited on the ground in inverted condition by the forward motion of the apparatus, the windrowed material being supported on the pick-up conveyor and on the rotatable platform on the underside to avoid agitation of the upper side thereof.

DESCRIPTION OF A PREFERRED EMBODIMENT

Figure 1:
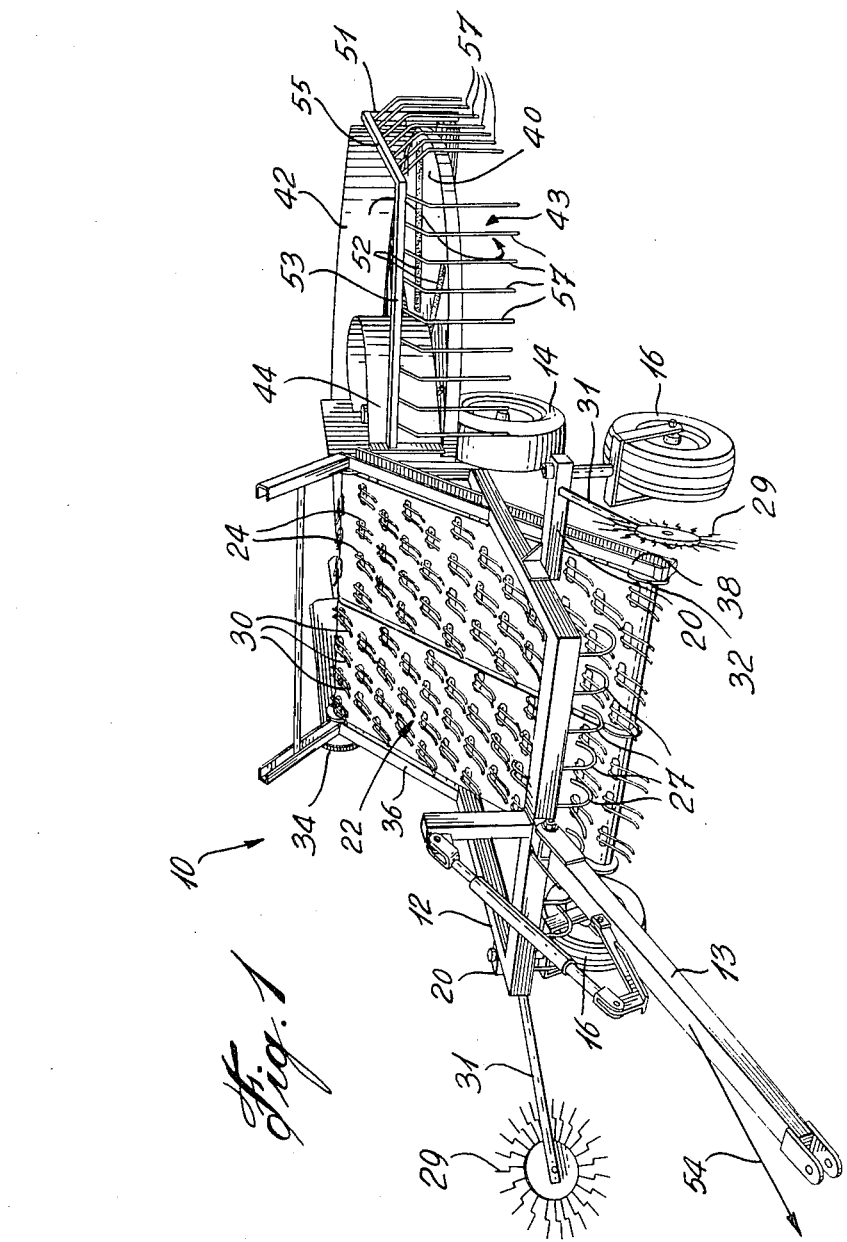
FIG. 1 is a perspective view of a windrow turning apparatus according to the present invention.
Figure 2:
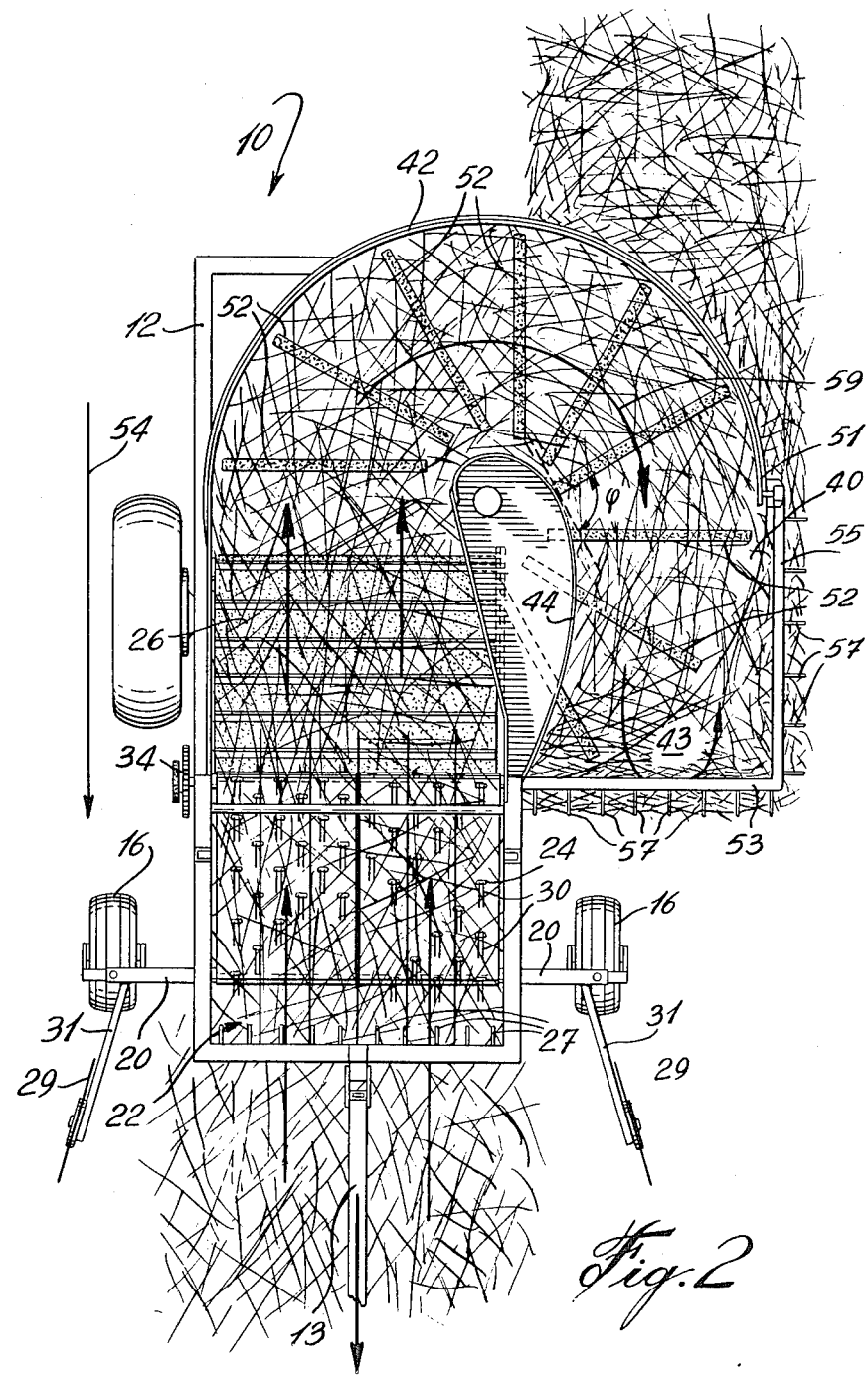
FIG. 2 is a top plan view of the apparatus illustrated in FIG. 1, some elements being omitted.

Referring now to FIGS. 1 and 2 of the annexed drawings, the windrow turning apparatus illustrated therein and identified generally by the reference numeral 10 is in the form of a carriage adapted to be drawn by a tractor or any other appropriate vehicle. The carriage comprises a main rectangular frame 12 made of hollow metallic beam members welded to each other at their ends. The frame 12 is supported on rear wheels 14 and on front caster wheels 16 allowing the carriage to be steered in any desired direction.

The caster wheels 16 are mounted to the frame 12 by means of short lateral extensions 20, in the form of hollow metallic members which are welded or otherwise attached to the frame 12.

The frame 12 is also provided with a conventional pulling bar 13 for connecting the windrow turning apparatus 10 to a pulling vehicle.

The apparatus 10 further includes a pick-up conveyor assembly 22 comprising a first conveyor 24, which is inclined upwardly and rearwardly, and a second generally horizontal conveyor 26, which is best illustrated in FIG. 2. More particularly, the inclined conveyor 24 comprises a pair of endless belts made of rubber-like material defining a continuous supporting surface, and on which are mounted a plurality of upstanding pick-up fingers 30 of a type well known in the art. The endless belts of the inclined conveyor 24 are mounted for rotation about a pair of spaced apart rollers 32 and 34 rotatably mounted at respective ends of two channel members 36 and 38, secured to the frame 12.

The horizontal conveyor 26 is of a similar construction except that it is shorter than the conveyor 24 and the pick-up fingers 30 have been omitted.

To the frame 12, adjacent the roller 32 are mounted a plurality of curved and rearwardly extending metallic bars 27. The purpose of the metallic bars 27, as it will appear hereinafter is to slightly press and guide the windrow toward the conveyor 24 as the apparatus 10 advances, this avoiding a buildup of hay which may form in front of the apparatus if the bars 27 were omitted.

The apparatus 10 further comprises a pair of rake wheels 29 mounted to the frame 12 by means of forwardly and laterally extending arms 31. Each rake wheel which is generally well known in the art is constituted by a plurality of radially extending tines defining a circular structure which can freely rotate at the end of the respective arm 31 when the apparatus 10 advances. The purpose of the rake wheels 29 is to guide the windrow toward the conveyor 24 during the operation of the apparatus 10.

The apparatus 10 further includes a rotatable platform 40 which is circular and is made of sheet-metal or any other appropriate material. The platform 40 is mounted to the frame 12 by means of suitable bearings for rotation about a generally vertical axis.

Figure 3:
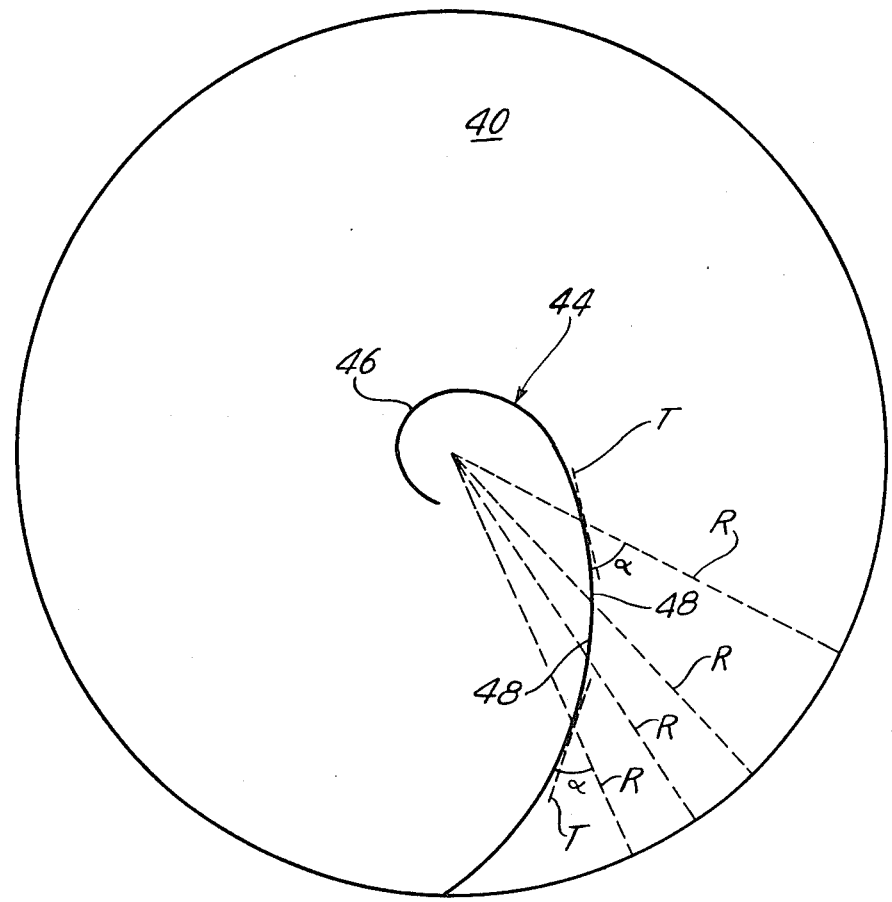
FIG. 3 is a schematical view illustrating the shape of a guide member of the apparatus according to the invention.

A pair of guide members of deflectors are mounted adjacent the rotatable platform 40 for guiding the movement of windrowed material thereon. More specifically an outer guide member 42 having an arcuate shape is mounted adjacent the periphery of the platform 40, extending along a substantial portion of the circumference thereof. An inner guide member 44, comprises an inner arcuate part 46 adjacent the axis of rotation of the rotatable platform 40, and an outer elongated curved part 48 connected to the inner part 46 and extending toward the periphery of the rotatable platform 40. The shape of the outer curved part 48 is relatively important for the success of the invention. More particularly, referring to FIG. 3, the outer curved part 48 is of such a shape so that the angle formed between an imaginary line tangent to the outer curved part at a certain point thereof, and an imaginary line extending along a radial direction with respect to the rotatable platform 40 and passing through the said certain point, remains constant when measured at various positions along the outer curved portion 48. As it appears from FIG. 3, the imaginary lines T which are tangent to the outer curved part 48 define the same angle $\alpha$ with imaginary lines R extending radially on the rotatable platform 40, at various positions on the outer curved part 48. This constant angle relation holds true for the major portion of the length of the curved part 48.

The outer and the inner guide members 42 and 44 are made of sheet-metal and are secured to the frame 12 by means of suitable brackets.

Between the outer portion of the guide member 44 and an extremity 51 of the guide member 42 is defined a discharge mouth portion 43 through which hay from the rotatable platform 40 is discharged on the ground as it will be explained in detail hereinafter.

A grating 53 is mounted in front of the mouth portion 43 to guide the windrowed material toward the ground and prevent it to be ejected too far away from the mouth portion 43 when the apparatus 10 operates at a relatively high speed. The grating 53 comprises an L-shaped metallic bar 55 secured to the frame 12 and a plurality of downwardly extending tines 57.

On the rotatable platform 40 are adhesively mounted a plurality of friction strips 52 having an upper face providing a high degree of friction. The friction strips 52 may be constituted by a strips of paper or the like material having an adhesive backing on one side and on the other side being provided with a layer of sand-like granular material. Each friction strip is generally straight and it is inclined with respect to a radial direction of the rotatable platform 40 so as to define an angle $\phi$ of approximately 45° with an imaginary line tangent to the outer curved part 48, along a major portion of the length of the outer curved part 48. In other words, during the rotation of the platform 40, when a given strip 52 passes along the outer curved portion 48, the angle $\phi$ remains constant when measured at various positions along the outer curved portion 48. The value of 45° for the angle $\phi$ is given only as an example and other values may be envisaged.

The inclined conveyor 24, the horizontal conveyor 26 and the rotatable platform 40 are driven by means of various power transmitting elements such as chains, sprockets and gears connected to the rear wheels 14 of the vehicle. Therefore, when the apparatus 10 is driven by a tractor or the like, the pick-up conveyor assembly and the rotatable platform 40 are automatically rotated. It is desirable that the linear speed of the conveyor 24 be slightly higher than the speed of the apparatus 10 with respect to the ground which may be easily achieved by selecting the proper ratios between the various gears on the other power transmitting components.

The particular set-up used to drive the rotatable platform 40 and the conveyors 24 and 26 will not be described in details since it is not essential to the invention and the design of such set-up is well within the reach of a man skilled in the art.

The operation of the apparatus 10 is as follows.

The apparatus 10 is connected to a tractor or any other similar vehicle to be drawn in a field over a windrow of hay or the like, in the direction indicated by the arrow 54 in FIGS. 1 and 2. The rake wheels 29 and the curved bars 27 guide the windrow toward the conveyor 24 which gathers material from the windrow and elevates the material at a point where it is deposited on the horizontal conveyor 26 which, in turn, deposits the material on the rotatable platform 40.

The latter advances the material along a circular path in the direction shown by the arrow 59 between the guide members 42 and 44, up to the discharge mouth portion 43 where the material falls on the ground and is inverted by the forward movement of the apparatus 10 to form a windrow is parallel to the windrow of unturned material but it is lateral offset on a dry surface.

During the whole operation, the windrowed material to be inverted is manipulated mainly from the underside which is still damp and less brittle than the upperside which is dry, thus preventing, at least to a certain extend the loss of nutrient qualities of the hay which occurs when conventional windrow turning apparatuses are used.

The shape of the outer curved part 48 allowing to obtain the constant angle relationship with the friction strips 52 permits to move the windrowed material with the platform 40 along a circular path and to deposit the material on the ground smoothly, without creating a buildup of hay at the mouth portion 43.

Although the invention has been described above with respect to one specific form, it will be evident to persons skilled in the art that it may be refined and modified in various ways. It is therefore wished to have it understood that the present invention should not be limited in interpretation except by the terms of the following claims.

I claim:

1. An apparatus for inverting a windrow of material such as hay ir the like in a delicate manner, said apparatus comprising:
    a carriage adapted to be advanced parallel to a windrow of said material lying upon the surface of the ground;
    a pick-up conveyor means mounted on said carriage, said pick-up conveyor means extending from a point adjacent to the ground to an elevated position for elevating progressively said widrow from the ground;
    a windrow turner including a rotatable platform mounted to said carriage adjacent said pick-up conveyor means for receiving windrowed material from said pick-up conveyor means and advancing the material along an approximately circular path, said rotatable platform having a roughened upper surface constituting mechanical anti-slipping means for reducing slippage of said material thereon;
    a discharge mouth portion on said carriage adjacent said rotatable platform through which material is deposited on the ground in inverted condition from sadi rotatable platform by the forward motion of said apparatus, the material being supported on said pick-up conveyor and on said rotatable platform on the underside to reduce agitation of the upper side thereof.

2. An apparatus as defined in claim 1, wherein said rotatable platform is substantially circular.

3. An apparatus as defined in claim 2, further comprising guide means mounted on said carriage for guiding the material during the movement thereof along said circular path.

4. An apparatus as defined in claim 3, wherein said guide means includes an outer guide member extending peripherally along said rotatable platform.

5. An apparatus as defined in claim 3, wherein said guide means includes an inner guide member comprising an elongated curved portion wherein an angle defined at a certain point on said curved portion by an imaginary line tangent to said curved portion at said certain point and an imaginary line extending radially with respect to said rotatable platform and passing through said certain point, remains constant when measured at different positions along said curved portion.

6. An apparatus as defined in claim 1, wherein said pick-up conveyor means includes a first conveyor inclined toward the rear and a second generally horizontal conveyor, wherein material from the windrow is gathered and elevated by said first conveyor and deposited on said second conveyor which deposits the material on said rotatable platform.

7. An apparatus as defined in claim 6, wherein said first conveyor comprises an endless belt made of rubber like material on which are mounted a plurality of pick-up fingers.

8. An apparatus as defined in claim 1, wherein said anti-slipping means comprise a plurality of strips having an upper surface providing a high degree of friction.

9. An apparatus as defined in claim 1, wherein the carriage is adapted to be driven by a vehicle such as a tractor.

10. An apparatus as defined in claim 1, wherein said carriage is mounted on wheel means, said pick-up conveyor means and said rotatable platform being driven by said wheel means through transmission means.

11. An apparatus as defined in claim 1, further comprising rake wheels mounted to said carriage for guiding said windrow toward said pick-up conveyor means.

12. An apparatus for inverting a windrow of material such as hay or the like in a delicate manner, said apparatus comprising:
    a carriage adapted to be advanced parallel to a windrow of said material lying upon the surface of the ground;
    a pick-up conveyor means mounted on said carriage, said pick-up conveyor means extending from a point adjacent to the ground to an elevated position for elevating progressively from said windrow from the ground;
    a windrow turner including a rotatable platform mounted to said carriage adjacent said pick-up conveyor means for receiving windrowed material from said pick-up conveyor means and advancing said material along an approximately circular path;
    a discharge mouth portion on the carriage adjacent said rotatable platform through which material is deposited on the ground in inverted condition from said rotatable platform by the forward motion of said apparatus, the material being supported on said pick-up conveyor and on said rotatable platform on the underside to reduce agitation of the upper side thereof;

a guide means mounted on said carriage for guiding the material during the movement thereof along said circular path, said guide means including an inner guide member comprising an elongated curved portion wherein an angle defined at a certain point on said curved portion by an imaginary line tangent to said curved portion at said certain point and an imaginary line extending radially with respect to said rotatable platform and passing through said certain point, remains constant when measured at different positions along said curved portion.

13. An apparatus as defined in claim 12, wherein said rotatable platform comprising on the upper surface thereof a plurality of friction strips having a roughened surface to reduce slippage between said material and said rotatable platform.

* * * * *